(12) United States Patent
Kim et al.

(10) Patent No.: US 9,183,969 B2
(45) Date of Patent: Nov. 10, 2015

(54) INSULATION COMPOSITION FOR DC POWER CABLE AND DC POWER CABLE PREPARED BY USING THE SAME

(71) Applicant: LS Cable & System Ltd., Anyang-si, Gyeonggi-do (KR)

(72) Inventors: Yoon Jin Kim, Gunpo-si (KR); Jin Ho Nam, Namyangju-si (KR); Young Ho Park, Seoul (KR); Son Tung Ha, Seoul (KR)

(73) Assignee: LS CABLE & SYSTEM LTD., Anyang-si, Gyeonggi-do (KR)

( * ) Notice: Subject to any disclaimer, the term of this patent is extended or adjusted under 35 U.S.C. 154(b) by 218 days.

(21) Appl. No.: 13/865,373

(22) Filed: Apr. 18, 2013

(65) Prior Publication Data
US 2014/0076609 A1 Mar. 20, 2014

(30) Foreign Application Priority Data
Sep. 19, 2012 (KR) .......................... 10-2012-0103786

(51) Int. Cl.
*H01B 3/44* (2006.01)
*H01B 9/00* (2006.01)
*H01B 9/02* (2006.01)

(52) U.S. Cl.
CPC ............... *H01B 9/00* (2013.01); *H01B 3/441* (2013.01); *C08K 2201/011* (2013.01); *H01B 9/027* (2013.01)

(58) Field of Classification Search
CPC ................................. H01B 3/441; H01B 9/00
USPC ..................... 174/120 SC; 524/586, 496, 127
See application file for complete search history.

(56) References Cited

U.S. PATENT DOCUMENTS

| | | | |
|---|---|---|---|
| 7,935,276 B2 * | 5/2011 | Zhou et al. ..................... | 252/511 |
| 2011/0040041 A1 * | 2/2011 | Kolb et al. ..................... | 525/240 |
| 2012/0012362 A1 | 1/2012 | Kim et al. | |
| 2013/0233383 A1 * | 9/2013 | Naumovitz et al. ........... | 136/259 |
| 2013/0260136 A1 * | 10/2013 | Wu et al. ........................ | 428/323 |

FOREIGN PATENT DOCUMENTS

| | | |
|---|---|---|
| KR | 10-2011-0138958 | 12/2011 |
| WO | WO 2011/124360 A1 | 10/2011 |

* cited by examiner

*Primary Examiner* — Timothy Thompson
*Assistant Examiner* — Charles Pizzuto
(74) *Attorney, Agent, or Firm* — Paratus Law Group, PLLC

(57) ABSTRACT

The present invention relates to an insulation composition for a DC power cable and the DC power cable prepared using the same. Specifically, the present invention relates to an improved insulation composition for a DC power cable, which can prevent decrease of DC dielectric strength and decrease of impulse strength caused by accumulation of space charges, and the DC power cable prepared using the same.

6 Claims, 3 Drawing Sheets

INSULATION COMPOSITION FOR DC POWER CABLE AND DC POWER CABLE PREPARED BY USING THE SAME

CROSS REFERENCE TO PRIOR APPLICATIONS

The present application claims priority under 35 U.S.C. §119 to Korean Patent Application No. 10-2012-0103786 (filed on Sep. 19, 2012), which is hereby incorporated by reference in its entirety.

BACKGROUND OF THE INVENTION

1. Field of the Invention

The present invention relates to an insulation composition for a DC power cable and the DC power cable prepared using the same. Specifically, the present invention relates to an improved insulation composition for a DC power cable, which can prevent decrease of DC dielectric strength and decrease of impulse strength caused by accumulation of space charges, and the DC power cable prepared using the same.

2. Background of the Related Art

A cross-sectional structure of a general power cable is as shown in FIGS. 1a and 1b. As shown in FIGS. 1a and 1b, the power cable may include a conductor 1 at the center, and an inner semi-conductive layer 2, an insulation layer 3, an outer semi-conductive layer 4, a sheath layer 5 and the like, which are formed around the conductor 1.

When a high DC voltage is applied to the power cable, electric charges are injected into the inner semi-conductive layer 2, the insulation layer 3 and the like from the conductor 1, and space charges are formed in the insulation layer 3 affected by injection of the electric charges. The space charges are accumulated in the insulation layer 3 in accordance with the time of using the cable, and when an impulse voltage is applied to the cable or polarity of the DC voltage applied to the cable is abruptly inverted, electric field strength around the conductor 1 is abruptly increased, and breakdown voltage of the power cable is lowered.

In order to solve the problem of DC dielectric strength and breakdown voltage of a cable, which are decreased due to the accumulation of space charges, a technique of adding an inorganic particle such as aluminum silicate, calcium silicate, calcium carbonate, magnesium oxide or the like to an insulation base resin configuring the insulation layer 3 is used in the prior art (see Japanese Patent Laid-Open Publication No. (S)57-21805 and Japanese Patent Registration No. 2541034 and 3430875). However, it is general that 1 to 80 parts by weight of the inorganic particle are added to the insulation layer 3 with respect to 100 parts by weight of base insulation resin and act as an impurity, and even when only a small content of the inorganic particle is added, impulse strength, which is another important feature required in the power cable, is lowered.

Meanwhile, a technique of using carbon nano-particles as an inorganic particle for suppressing accumulation of space charges in the insulation layer is disclosed (See Korean Patent Laid-Open Publication No. 2011-0138958). However, since the carbon nano-particles have a low dispersibility with respect to a base resin such as polyethylene, polypropylene or the like of hydrophobicity and form aggregates in the base resin, they cannot efficiently reduce accumulation of the space charges and thus may lower the impulse strength.

As described above, since the impulse strength is lowered when inorganic particles are added to suppress accumulation of space charges, thickness of the insulation layer 3 of a DC power cable is determined by the impulse strength of the cable, rather than the breakdown voltage, and since the outer diameter of the cable is increased accordingly, it is problematic from the manufacturing and economical viewpoint.

Accordingly, required is an improved insulation material for a DC power cable, which can accomplish two features required in the DC power cable, i.e., suppressing decrease of DC dielectric strength and breakdown voltage of the cable caused by accumulation of space charges and suppressing decrease of impulse strength without increasing the outer diameter of the cable.

SUMMARY OF THE INVENTION

Therefore, the present invention has been made in view of the above problems, and it is an object of the present invention to provide an insulation composition, which can suppress decrease of DC dielectric strength and breakdown voltage caused by accumulation of space charges in a DC power cable, and the DC power cable manufactured using the insulation composition.

In addition, another object of the present invention is to provide an insulation composition, which can suppress decrease of DC dielectric strength and breakdown voltage caused by accumulation of space charges and suppress decrease of impulse strength without increasing an outer diameter of a cable, and a DC power cable manufactured using the insulation composition.

In accordance with one embodiment of the invention, an insulation composition for a DC power cable comprises a base resin including polyolefin; and 0.03 to 0.1 percent by weight of baked carbon nano-particles, with respect to a total weight of the composition. The thickness of the based carbon nano-particles is 10 nm or less. The baked carbon nano-particles are baked nano plates formed by laminating graphite layers. The content of oxygen in the baked carbon nano-particles is 3 percent by weight or less, with respect to a total weight of the particle.

In another embodiment, an insulation composition for a dc power cable is also presented according to the invention, wherein the polyolefin includes a homopolymer of ethylene, a copolymer of the ethylene and other α-olefin, a homopolymer of propylene, a copolymer of the propylene and other α-olefin, and a mixture of these. The insulation composition contains 1 to 5 percent by weight of a cross-linking agent selected from a group consisting of a silane-based cross-linking agent; an organic peroxide cross-linking agent such as dicumyl peroxide, benzoyl peroxide, lauryl peroxide, t-butyl cumyl peroxide, di(t-butyl peroxy isopropyl)benzene, 2,5-dimethyl-2,5-di(t-butyl peroxy)hexane, or di-t-butyl peroxide; and mixtures thereof, with respect to a total weight of the composition.

In other embodiments, an insulation composition for a dc power cable is also presented according to the invention, wherein the insulation composition contains 0.1 to 2 percent by weight of an antioxidant selected from a group consisting of an amine-based antioxidant; a thioester-based antioxidant such as dialkylester base, distearyl thiodipropionate or dilauryl thiodipropionate; a phenyl-based antioxidant such as tetrakis(2,4-di-t-butylphenyl)4,4'-biphenylene diphosphite, 2,2'-thio diethyl bis-[3-(3,5-di-t-butyl-4-hydroxyphenyl)-propionate], pentaerithrityl-tetrakis-[3-(3,5-di-t-butyl-4-hydroxyphenyl)-propionate], 4,4'-thiobis(2-methyl-6-t-butylphenol), 2,2'-thiobis(6-t-butyl-4-methyphenol), triethylene glycol-bis-[3-(3-t-butyl-4-hydroxy-5-methylphenyl)propionate]); and mixtures thereof, with respect to a total weight of the composition.

In yet other embodiments, a DC power cable is also presented according to the invention that comprises a conductor; an insulation layer manufactured using said insulation composition for a DC power cable; an inner semi-conductive layer arranged between the conductor and the insulation layer; an outer semi-conductive layer arranged outside of the insulation layer; and a sheath layer arranged outside of the outer semi-conductive layer.

Further features, uses and advantages of the invention will appear more clearly on a reading of the following detailed description of the preferred embodiment of the invention, which is given by way of non-limiting example only and with reference to the accompanying drawings.

DESCRIPTION OF SYMBOLS

Figure 1A:
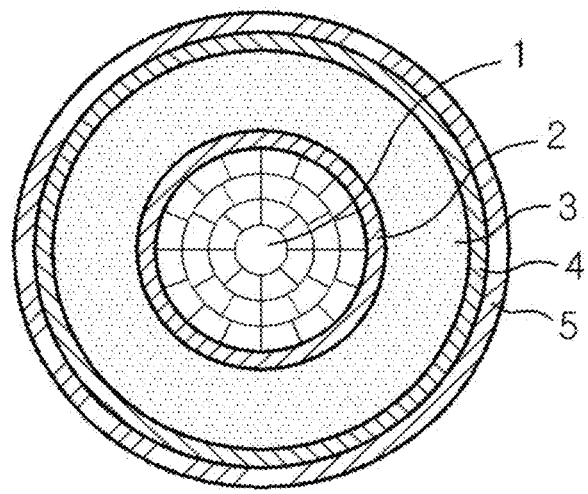
FIG. 1a is a cross-sectional view and a perspective view schematically showing the structure of a conventional DC power cable.
Figure 1B:
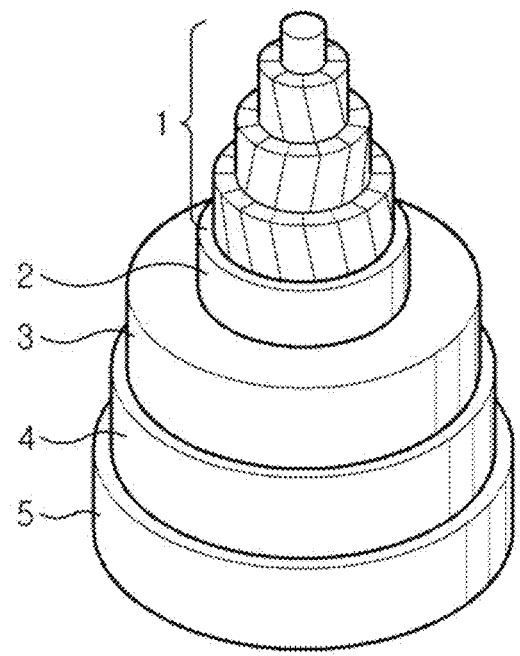
FIG. 1b is a longitudinal-sectional view and a perspective view schematically showing the structure of a conventional DC power cable.

| 1: Conductor | 2: Inner semi-conductive layer |
| 3: Insulation layer | 4: Outer semi-conductive layer |
| 5: Sheath layer | |

DETAILED DESCRIPTION OF THE PREFERRED EMBODIMENT

An insulation composition for a DC power cable according to the present invention contains a base resin and carbon nano-particles.

Since most of polymers configuring the base resin are electrically insulated materials, they are not limited specially. Although ions capable of moving positive charges or electrons or free electrons such as a kind of metal are required in order to flow electricity, the polymers are almost lack of such a capability since they are materials formed by covalent bonding among carbons.

Generally, polyolefin such as polyethylene, polypropylene or the like can be used as a base resin configuring the insulation composition for a cable.

The polyethylene means a polymer containing at least 50 percent by weight or more of polyethylene and may include an ethylene homopolymer and/or a copolymer of ethylene and α-olefin such as propylene, 1-butene, 1-pentene, 1-hexene, 1-octenet or the like. In addition, the polyethylene may contain very low density polyethylene, low density polyethylene, linear low density polyethylene, high density polyethylene or mixtures thereof. For example, the polyethylene may have a density of 0.86 to 0.98 g/cm$^3$ (measured using ASTM D-792), a melt index of 0.01 to 100 dg/minute (measured using ASTM D-1238), a Weight Average Molecular Weight (Mw) of 40,000 to 200,000, and a distribution of molecular weight (Mw/Mn) of 1.5 to 8.

Meanwhile, the polypropylene is a polymer containing at least 50 percent by weight or more of polypropylene and may include a propylene homopolymer and/or a copolymer of propylene and ethylene or α-olefin having 4 to 8 carbon atoms, such as 1-butene, 1-pentene, 1-hexene, 1-octenet or the like. Particularly, the propylene copolymer may be a random copolymer or a block copolymer in which propylene and ethylene and/or α-olefin are polymerized without a pattern. Here, the content of comonomer may be about 0.5 to 20 percent by weight with respect to the overall weight of the polymer. In addition, the polypropylene may include a mixture of polyolefin such as low density polyethylene, linear low density polyethylene or the like.

Furthermore, the polypropylene, for example, may have a melt index of 0.01 to 1,000 dg/minute (measured using ASTM D-1238), a melting temperature (Tm) of 110 to 175° C. (measured using DSC), and a maximum crystallization temperature of 110 to 125° C. (measured using DSC). Here, when the maximum crystallization temperature is less than 110° C., heat resistance of the insulation layer may be insufficient, and when the maximum crystallization temperature exceeds 125° C., tensile elongation may be lowered at a room temperature.

In addition, the polypropylene, for example, may have a Weight Average Molecular Weight (Mw) of 200,000 to 450,000. When the Weight Average Molecular Weight (Mw) is less than 200,000, mechanical properties of the insulation layer can be degraded, and when the Weight Average Molecular Weight (Mw) exceeds 450,000, workability may be lowered due to high viscosity. Furthermore, the polypropylene, for example, may have a distribution of molecular weight (Mw/Mn) of 2 to 8. When the distribution of molecular weight (Mw/Mn) is less than 2, workability may be lowered due to high viscosity, and when the distribution of molecular weight (Mw/Mn) exceeds 8, mechanical properties can be degraded.

The polypropylene has superior electrical properties identical or similar to the polyethylene, and particularly, it has excellent heat resistance compared with the polyethylene.

Meanwhile, the polyethylene and the polypropylene may be a non-cross-linked or cross-linked resin. Here, the cross-linked polyethylene and the cross-linked polypropylene may be prepared by using silane or organic peroxides, e.g., dicumyl peroxide (DCP) or the like as cross-linking agents. However, the cross-linked polyethylene and the cross-linked polypropylene are difficult to be reused, and they can lower long-term extrudability such as not to show uniform production capability if cross-linking or scorch occurs in an early stage when the insulation layer is prepared. In addition, cross-linking byproducts such as acetophenone, α-methylstyrene or the like may easily accumulate space charges in the insulation layer.

The carbon nano-particles may be graphite, graphene or the like. The carbon nano-particles have a further larger potential well at an interface between the carbon nano-particles and the insulation base resin, compared with a conventional dielectric metal oxide such as magnesium oxide or titanium dioxide. That is, the carbon nano-particles have a relatively further larger potential well due to relatively high electrical conductivity. Specifically, since a further larger potential well is formed at the interface between the base resin and the carbon nano-particles when an electric field is applied, an effect of suppressing movement of charges and accumulation of space charges is exhibited. As a result, although a considerably small number of carbon nano-particles are used compared with a case of using the conventional dielectric metal oxide, a superior effect of reducing space charges is exhibited, and at the same time, an effect of minimizing decrease of impulse strength and extrudability of the insulation layer is exhibited by adding the carbon nano-particles as an impurity.

In addition, the carbon nano-particles preferably have a tensile strength of 10 to 20 GPa and induce increase of glass transition temperature of the insulation composition, and thus an effect of improving physical properties such as increase of thermal stability or the like can be expected. Furthermore, since the carbon nano-particles are ten times or more cheaper than the metal oxide such as titanium dioxide, an effect of saving manufacturing cost can be expected.

However, since the graphite among the carbon nano-particles has a very stiff and brittle structure while having an average diameter of 1 mm to 2.5 cm, it may lower the impulse strength and extrudability of the insulation layer if it is added in the insulation layer. In addition, carbon blacks among the conventional carbon nano-particles may form aggregates due to hydrogen bonding among the particles, and dispersion of the carbon blacks with respect to the base resin could be difficult. Accordingly, the carbon nano-particles may be nano-sized carbon particles including a graphite layer of 32-ply or less, preferably 6-ply or less, and further preferably 1-ply, i.e., graphene particles. Furthermore, thickness of the carbon nano-particles can be set to be preferably 10 nm or less.

Meanwhile, 0.03 to 0.1 percent by weight of the carbon nano-particles can be contained with respect to the total weight of the insulation composition. When the content of the carbon nano-particles is less than 0.03 percent by weight, the intended effect of reducing accumulation of space charges cannot be sufficiently achieved, and when the content of the carbon nano-particles exceeds 0.1 percent by weight, impulse strength and extrudability of the insulation layer may be lowered, and, since the carbon nano-particles are conductive particles, it is apprehended that dielectric properties or resistivity of the insulation layer can be lowered.

In addition, a shape of the carbon nano-particles is not specially limited, and, for example, they can be shaped as a circle, a plate, a bar or a tube. However, if the carbon nano-particles are formed in a shape of a tube or a bar, an electrical conduction path is formed, or impulse strength of the insulation layer can be lowered due to cohesion or entanglement, and thus it is desirable to form the carbon nano-particles in a shape of a plate, i.e., a nano plate shape.

The carbon nano-particles may contain 10 percent by weight of oxygen with respect to the total weight of the particle if it is not baked. This means that a functional group such as a carboxyl group, a hydroxyl group, an epoxide group or the like is formed due to the imperfect crystal structure of the surface of the carbon nano-particles. The functional groups tend to increase affinity between the carbon nano-particles and polar solvent such as water or the like, i.e., hydrophilicity, but decrease compatibility of the carbon nano-particles with the base resin such as polyethylene or polypropylene of hydrophobicity, i.e., dispersibility of the carbon nano-particles in the base resin. As a result, since dispersibility of the carbon nano-particles with respect to the base resin is lowered, the intended effect of reducing accumulation of space charges cannot be achieved, and impulse strength and extrudability of the insulation layer can be lowered.

Accordingly, dispersibility of the carbon nano-particles with respect to the hydrophobic base resin is improved by reducing the content of oxygen by baking the carbon nano-particles, and thus the intended effect of reducing accumulation of space charges can be achieved. The baked carbon nano-particles may contain 9 percent by weight or less, preferably 3 percent by weight or less of oxygen with respect to the total weight of the particle.

In addition, the process of baking the carbon nano-particles is not specially limited as far as the content of oxygen contained in the carbon nano-particles can be reduced, and, for example, the carbon nano-particles can be heat-treated for five hours in an inert gas atmosphere such as nitrogen, helium, hydrogen or the like at a high temperature of 400° C. or higher. Therefore, the crystal structure of the carbon nano-particles is improved by effectively cutting off dangling bonds with the functional group containing oxygen. As a result, dispersibility of the carbon nano-particles with respect to the base resin can be improved by modifying the surface of the carbon nano-particles into hydrophobicity.

Meanwhile, when the base resin is desired to be used in a cross-link form, the insulation composition for a DC power cable according to the present invention may additionally contain a cross-linking agent selected from a group consisting of a silane-based cross-linking agent; an organic peroxide cross-linking agent such as dicumyl peroxide, benzoyl peroxide, lauryl peroxide, t-butyl cumyl peroxide, di(t-butyl peroxy isopropyl)benzene, 2,5-dimethyl-2,5-di(t-butyl peroxy) hexane, di-t-butyl peroxide or the like; and mixtures thereof. Here, 1 to 5 percent by weight of the cross-linking agent can be contained with respect to the total weight of the insulation composition.

In addition, the insulation composition for a DC power cable according to the present invention may additionally contain other additives such as an antioxidant, a heat stabilizer, an ion scavenger and the like.

Particularly, the antioxidant can be selected from a group consisting of an amine-based antioxidant; a thioester-based antioxidant such as dialkylester, distearyl thiodipropionate or dilauryl thiodipropionate-based antioxidant; a phenyl-based antioxidant such as tetrakis (2,4-di-t-butylphenyl)4,4'-biphenylene diphosphite, 2,2'-thio diethyl bis-[3-(3,5-di-t-butyl-4-hydroxyphenyl)-propionate], pentaerithrityl-tetrakis-[3-(3,5-di-t-butyl-4-hydroxyphenyl)-propionate], 4,4'-thiobis(2-methyl-6-t-butylphenol), 2,2'-thiobis(6-t-butyl-4-methyphenol), or triethylene glycol-bis-[3-(3-t-butyl-4-hydroxy-5-methylphenyl)propionate]); and mixtures thereof. Here, 0.1 to 2 percent by weight of antioxidant can be used with respect to the total weight of the insulation composition.

In addition, the heat stabilizer can be selected from a group consisting of a reactant of diphenylamine and acetone, zinc 2-mercaptobenzimidazolate, 4,4'-bis(α,α-dimethylbenzyl) diphenylamine, pentaerythritol-tetrakis[3-(3,5-di-tert-butyl-4-hydroxy-phenyl)-propionate], pentaerythritol-tetrakis-(β-lauryl-thiopropionate, 2,2'-thiodiethylene bis-[3-(3,5-ditert, butyl-4-hydroxyphenyl)-propionate], distearyl-ester of β,β'-thiodipropionic acid, and mixtures thereof. Here, 0.1 to 2 percent by weight of heat stabilizer can be used with respect to the total weight of the insulation composition.

In addition, aryl-based silane or the like can be used as the ion scavenger. Here, 0.1 to 2 percent by weight of ion scavenger can be used with respect to the total weight of the insulation composition, and it may accelerate the effect of reducing accumulation of space charges.

The present invention relates to a DC power cable containing an insulation layer prepared using the insulation composition described above. The DC power cable may include a conductor made of a conductive material such as copper, aluminum or the like, an insulation layer made of an insulating polymer, an inner semi-conductive layer positioned between the conductor and the insulation layer to suppress partial discharge at the interface with the conductor, remove an air layer between the conductor and the insulation layer and mitigate local concentration of electric field, an outer semi-conductive layer for shielding the cable and uniformly applying the electric field to the insulator, and a sheath layer for protecting the cable.

Specifications of the conductor, the insulation layer, the semi-conductive layers and the sheath layer can be diversified depending on the usage of the cable, transmission voltage and the like, and materials configuring the semi-conductive layers and the sheath layer may be the same as or different from the material configuring the insulation layer.

EXAMPLES

Hereinafter, preferred embodiments of the present invention will be described in detail. However, the present invention is not limited to the embodiments described below and can be embodied in a different form. Rather, the embodiments introduced here are provided to sufficiently transfer the spirits of the present invention to those skilled in the art as the disclosed contents become further complete and perfect.

In order to observe the effects of the insulation composition for a DC power cable according to the present invention, insulation compositions of an example and comparison examples are prepared as shown in Table 1. Here, the unit is percent by weight. Particularly, carbon nano-powder is totally crushed in a blender and directly mixed with base resin using an internal mixer (manufacturer: HAAKE) at 120° C. In addition, the cross-linking process is performed by hot pressing for 30 minutes at 180° C., and the samples are deaerated in a vacuum oven for 24 hours before measuring space charges.

TABLE 1

| Compositions | Example 1 | Comparison Examples | | | |
|---|---|---|---|---|---|
| | | 1 | 2 | 3 | 4 |
| Base resin | 97.45 | 97.5 | 97.45 | 97 | 96.5 |
| Carbon nano-particles 1 | 0.05 | | | | |
| Carbon nano-particles 2 | | | 0.05 | | |
| Magnesium oxide | | | | 0.5 | 1 |
| Cross-linking agent | 2 | 2 | 2 | 2 | 2 |
| Antioxidant | 0.5 | 0.5 | 0.5 | 0.5 | 0.5 |

Base resin: Low density polyethylene (Manufacturer: LG Chemical Co., Product name: CB2030)

Carbon nano-particles 1: Graphene baked for five hours in nitrogen atmosphere at 400° C., content of oxygen is 3 percent by weight (Manufacturer: XG Science Co., Product name: XGnP C-750 (specific surface area is 750 $m^2/g$))

Carbon nano-particles 2: Graphene not baked, content of oxygen is 10 percent by weight (Manufacturer: XG Science Co., Product name: XGnP C-750 (specific surface area is 750 $m^2/g$))

Figure 2:
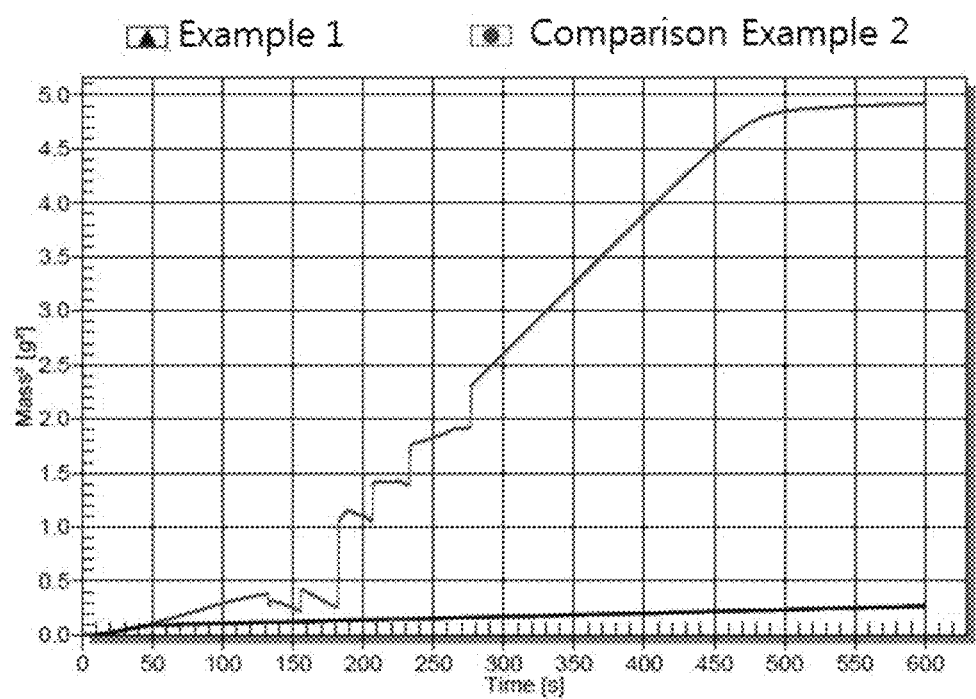
FIG. 2 is a view showing a result of measuring wettability of carbon nano-particles for water in the present invention.

Magnesium oxide: Regular hexahedron magnesium oxide which is surface-modified with vinyl silane Cross-linking agent: Dicumyl peroxide Antioxidant: Tetrakis(2,4-di-t-butylphenyl)-4,4'-biphenylene diphosphate 1) Evaluation of Dispersibility of Carbon Nano-Particles with Respect to Base Resin Wettability of graphene particles contained in the graphene/resin insulation compositions prepared in example 1 and comparison example 2 is measured with respect to water along time using the Washburn method, and its result is shown in FIG. 2. As shown in FIG. 2, the baked graphene particles used in example 1 absorb/adhere only a small amount of water as time passes by, whereas the unbaked graphene particles used in comparison example 2 rapidly absorb/adhere water as time passes by and arrives at a saturation state after 500 seconds. That is, hydrophobicity of the graphene particle is increased by the baking, and as a result, dispersibility with respect to the hydrophobic base resin is improved.

Figure 3A:
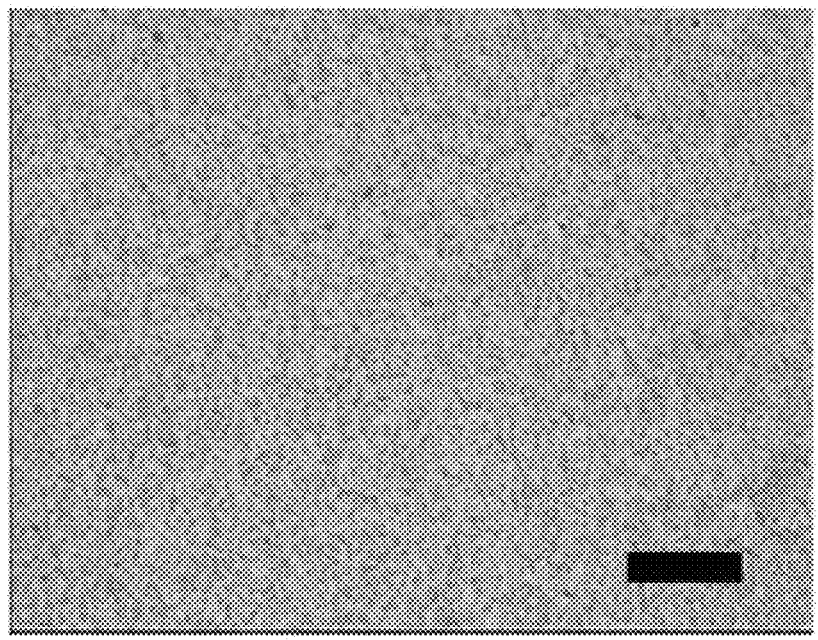
FIG. 3a shows an optical picture of a sample sheet prepared from example 1.
Figure 3B:
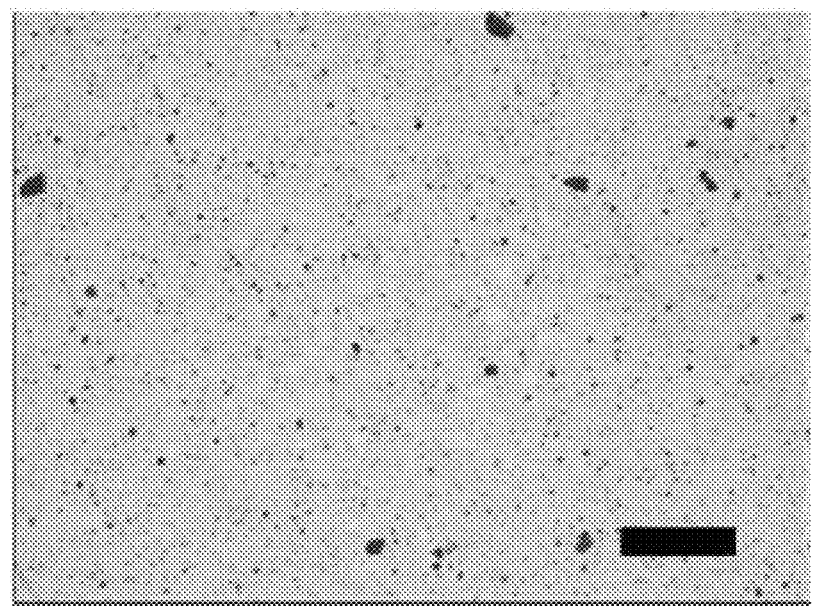
FIG. 3b shows an optical picture of a sample sheet prepared from comparison example 2.

In addition, after manufacturing samples sheets by applying heat/pressure to the graphene/resin insulation compositions prepared in example 1 and comparison example 2, their optical pictures are photographed as shown in FIGS. 3a and 3b. That is, FIG. 3a shows an optical picture of a sample sheet according to example 1, and FIG. 3b shows an optical picture of a sample sheet according to comparison example 2. It is understood that the unbaked graphene particles (comparison example 2) have low dispersibility with respect to the base resin since a large number of aggregates are observed as shown in FIG. 3b, and it is confirmed that dispersibility of the baked graphene particles (example 1) is greatly improved with respect to the base resin since the hydrophobicity of the graphene particles is improved.

2) Evaluation of Effect of Reducing Accumulation of Space Charges

Sample sheets are manufactured by applying heat/pressure to the insulation compositions prepared in example 1 and comparison examples 1 to 4. After attaching the sample sheet to an electrode unit having a semi-conductive electrode (an upper electrode) and an aluminum electrode (a lower electrode) with a thickness of 100 to 150 μm, behaviors of the space charges are observed by applying an electric field of 120 kV/mm for 1,800 seconds at 30-second intervals, and maximum electric field strength is calculated therefrom. In addition, in the case of example 1 and comparison example 2, maximum electric field strength is calculated in the same method as described above at 80° C., which is the temperature using the cable. The calculated maximum electric fields are as shown in table 2. Here, the maximum electric field means an electric field that the insulation composition actually receives as the thickness of the insulation material is reduced due to the accumulation of the space charges. Accordingly, it is understood that the effect of controlling the space charges is improved as the maximum electric field approaches an actually applied electric field.

TABLE 2

| Classification | | Example 1 | Comparison Examples | | | |
|---|---|---|---|---|---|---|
| | | | 1 | 2 | 3 | 4 |
| Maximum electric field (kV/mm) | Room temperature | 125 | 250 | 151 | 128 | 123 |
| | 80° C. | 130 | — | 160 | — | — |

As shown in Table 2, it is confirmed that since the insulation composition according to example 1 does not contain carbon nano-particles such as graphene or the like, the electric field is strengthened to be 250 kV/mm, which is very high compared with the applied electric field of 120 kV/mm, as a large number of space charges are accumulated at the positive electrode as time passes by. In addition, although the insulation composition according to comparison example 2 contains graphene particles, since the graphene particles are not baked, the graphene particles do not sufficiently exhibit the effect of reducing accumulation of space charges, such as to have low dispersibility with respect to the base resin, and thus it is confirmed that the electric field is strengthened to be 151 kV/mm at a room temperature and 160 kV/mm at 80° C.

In addition, it is confirmed that the insulation compositions according to comparison examples 3 and 4 contain magnesium oxide instead of carbon nano-particles as is done in the prior art, and an effect of reducing space charges to a level similar to that of example 1 is exhibited. However, the content of magnesium oxide is 0.5 percent by weight (comparison example 3) and 1 percent by weight (comparison example 4), which are contents corresponding to 10 to 20 times of 0.05 percent by weight of the graphene used in example 1, and it is expected that the impulse strength of the insulation layer will be reduced.

Contrarily, the maximum electric field strength of the insulation composition according to example 1 is 125 kV/mm at a room temperature and 130 kV/mm at 80° C., which are not greatly increased compared with the applied electric field of 120 kV/mm, and thus it is confirmed that the effect of reducing accumulation of space charges is excellent.

3) Evaluation of Impulse Strength 30 sample sheets are manufactured for each of the insulation compositions prepared in example 1 and comparison examples 2 to 4 by applying heat/pressure to the insulation compositions. After attaching the sample sheet to an electrode unit having a diameter of 13 mm to have a thickness of 100 to 150 μm, a standard lightning impulse voltage having a wave front and wave tail length of 1.2×50 μs is applied using an impulse voltage generator (manufacturer: High Voltage Co., 1600 kV). An initially applied voltage is 70% of an expected breakdown voltage, and impulse breakdown strength at a time point when dielectric breakdown occurs is measured while increasing voltage by 10 kV, and a 0% breakdown value is obtained through Weibull Distribution. In addition, the impulse strength is measured at 20° C. and 90° C. A result of measuring the impulse strength for example 1 and comparison examples 2 to 4 is as shown in Table 3.

TABLE 3

| Classification | | Example 1 | Comparison Examples | | |
|---|---|---|---|---|---|
| | | | 2 | 3 | 4 |
| Impulse strength (kV) | 20° C. | 285 | 241 | 265 | 246 |
| | 90° C. | 181 | 140 | 163 | 138 |

As shown in Table 3, it is confirmed that since the insulation composition according to comparison example 2 contains unbaked hydrophilic graphene particles as described above, dispersibility of the grapheme particles is low with respect to the base resin, and thus impulse strength of the insulation layer is lowered such as to form aggregates. In addition, it is confirmed that since the insulation compositions according to comparison examples 3 and 4 contain a large amount of magnesium oxide instead of the carbon nano-particles as is done in the prior art, impulse strength of the insulation layer is lowered.

Contrarily, it is confirmed that since the insulation composition according to example 1 contains graphene particles modified to be hydrophobic through baking, it exhibits an excellent effect of minimizing decrease of the impulse strength.

In example 1, cross-linked polyethylene (XLPE) is used as a base resin by adding a cross-linking agent to low density polyethylene. As described above, the cross-linked polyethylene produces cross-linking byproducts such as acetophenone, α-methylstyrene and the like, and the cross-linking byproducts may lower the impulse strength, as well as making it easy to accumulate space charges in the insulation layer. That is, in the present invention, even when non-cross-linked polyethylene, non-cross-linked polypropylene or the like is used instead of the cross-linked polyethylene used in example 1, it is naturally expected to exhibit an effect that is the same as or further superior to the effect of example 1.

Since the insulation composition for a DC power cable according to the present invention contains inorganic particles having an outstanding effect of suppressing accumulation of space charges in an insulation layer, it shows an excellent effect of significantly suppressing decrease of DC dielectric strength and breakdown voltage caused by accumulation of space charges in the insulation layer.

In addition, since the insulation composition for a DC power cable according to the present invention contains only an extremely small number of inorganic particles as an impurity compared with the content of other inorganic particles of the prior art, it shows an excellent effect of significantly suppressing decrease of impulse strength of the insulation layer caused by the inorganic particles.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. An insulation composition for a DC power cable, the composition comprising:
   a base resin including polyolefin; and
   0.03 to 0.1 percent by weight of baked carbon nano-particles, with respect to a total weight of the composition,
   wherein the baked carbon nano-particles, include 3 or less weight percent of oxygen, with respect to a total weight of the particle.

2. The composition according to claim 1, wherein thickness of the baked carbon nano-particles is 10 nm or less.

3. The composition according to claim 2, wherein the baked carbon nano-particles include nano plates formed by laminating and baking graphene layers.

4. The composition according to claim 1, wherein the polyolefin includes a homopolymer of ethylene, a copolymer of the ethylene and other α-olefin, a homopolymer of propylene, a copolymer of the propylene and other α-olefin, and mixtures thereof.

5. The composition according to claim 4, wherein the insulation composition contains 1 to 5 percent by weight of a cross-linking agent selected from a group consisting of a silane-based cross-linking agent; an organic peroxide cross-linking agent such as dicumyl peroxide, benzoyl peroxide, lauryl peroxide, t-butyl cumyl peroxide, di(t-butyl peroxy isopropyl)benzene, 2,5-dimethyl-2,5-di(t-butyl peroxy)hexane, or di-t-butyl peroxide; and mixtures thereof, with respect to a total weight of the composition.

6. The composition according to claim 1, wherein the insulation composition contains 0.1 to 2 percent by weight of an antioxidant selected from a group consisting of an amine-based antioxidant; a thioester-based antioxidant such as dialkylester base, distearyl thiodipropionate or dilauryl thiodipropionate; a phenyl-based antioxidant such as tetrakis(2,4-di-t-butylphenyl)4,4'-biphenylene diphosphite, 2,2'-thiodiethyl bis-[3-(3,5-di-t-butyl-4-hydroxyphenyl)-propionate], pentaerithrityl-tetrakis-[3-(3,5-di-t-butyl-4-hydroxyphenyl)-propionate], 4,4'-thiobis(2-methyl-6-t-butylphenol), 2,2'-thiobis(6-t-butyl-4-methyphenol), triethylene glycol-bis-[3-(3-t-butyl-4-hydroxy-5-methylphenyl)propionate]); and mixtures thereof, with respect to a total weight of the composition.

\* \* \* \* \*